(12) United States Patent
Bettes et al.

(10) Patent No.: US 8,744,865 B2
(45) Date of Patent: Jun. 3, 2014

(54) APPARATUS AND METHOD FOR TRANSPORTATION AND UPSELLING OF PRODUCT

(75) Inventors: Richard B. Bettes, Flagstaff, AZ (US);
Stephen E. Jaffe, Canton, GA (US);
Bret R. Sanderfur, Elburn, IL (US);
Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 671 days.

(21) Appl. No.: 11/614,782

(22) Filed: Dec. 21, 2006

(65) Prior Publication Data
US 2008/0154659 A1 Jun. 26, 2008

(51) Int. Cl.
*G06Q 10/00* (2012.01)
*G06F 17/00* (2006.01)
*G06G 7/00* (2006.01)

(52) U.S. Cl.
USPC ............................................ 705/1.1; 705/400

(58) Field of Classification Search
USPC ..................... 705/1.1, 7.11–7.42, 400–412
See application file for complete search history.

(56) References Cited

U.S. PATENT DOCUMENTS

| | | | | | |
|---|---|---|---|---|---|
| 3,430,410 | A | * | 3/1969 | Heisler | 53/446 |
| 5,595,444 | A | * | 1/1997 | Tong et al. | 374/45 |
| 5,983,198 | A | * | 11/1999 | Mowery et al. | 705/22 |
| 6,401,078 | B1 | | 6/2002 | Roberts et al. | |
| 6,486,899 | B1 | * | 11/2002 | Bush, Jr. | 715/855 |
| 6,721,762 | B1 | | 4/2004 | Levine et al. | |
| 6,767,284 | B1 | * | 7/2004 | Koza | 463/29 |
| 6,968,326 | B2 | | 11/2005 | Johnson et al. | |
| 7,058,596 | B1 | * | 6/2006 | Wojcik et al. | 705/26 |
| 7,277,866 | B1 | * | 10/2007 | Or-Bach et al. | 705/28 |
| 2002/0188499 | A1 | | 12/2002 | Jenkins et al. | |
| 2002/0198759 | A1 | | 12/2002 | Gilday et al. | |
| 2003/0014288 | A1 | | 1/2003 | Clarke et al. | |
| 2003/0023483 | A1 | * | 1/2003 | Messner et al. | 705/14 |
| 2003/0023507 | A1 | | 1/2003 | Jankelewitz | |
| 2005/0144127 | A1 | | 6/2005 | Miller et al. | |
| 2005/0189415 | A1 | | 9/2005 | Fano et al. | |
| 2005/0197876 | A1 | * | 9/2005 | Benda et al. | 705/7 |
| 2005/0267791 | A1 | * | 12/2005 | LaVoie et al. | 705/7 |
| 2006/0111963 | A1 | | 5/2006 | Li et al. | |
| 2006/0111986 | A1 | * | 5/2006 | Yorke et al. | 705/26 |
| 2006/0242011 | A1 | | 10/2006 | Bell et al. | |
| 2007/0257111 | A1 | | 11/2007 | Ortenzi | |

FOREIGN PATENT DOCUMENTS

WO WO 0157766 A2 * 8/2001
WO WO 2004006137 A1 * 1/2004

OTHER PUBLICATIONS

Boyar et al., The Maximum resource bin packing problem, Theoretical Computer Science 362 (2006) 127-139.*
"Modeling Issues in a Shipping System", Proceedings of the 1996 Winter Simulation Conference, pp. 1353-1358, Edward J. Williams and Susan Khoubyari.

(Continued)

*Primary Examiner* — George Chen
(74) *Attorney, Agent, or Firm* — Matthew Chung; Roberts Mlotkowski Safran & Cole, P.C.

(57) ABSTRACT

A system and method for using product profiling to maximize load capacity of a vehicle. The method comprises defining product profiles and retrieving product information associated with the product profiles. The method further includes performing cubing operations for products associated with the product information. The system includes components to perform the method steps.

32 Claims, 4 Drawing Sheets

(56) References Cited

OTHER PUBLICATIONS

"An intelligent logistics support system for enhancing the airfreight forwarding business", Expert Systems, Nov. 2004, vol. 21, No. 5, pp. 253-268, H.C.W. Lau, K.L. Choy, Peter K.H. Lau, W.T. Tsui and L.C. Choy, Nov. 2004.

Notice of Allowance dated Jul. 19, 2013 in related U.S. Appl. No. 13/483,131, 8 pages.

Office Action for related U.S. Appl. No. 13/483,131 dated Nov. 16, 2012.

Final Office Action for related U.S. Appl. No. 13/483,131 dated May 9, 2013, 18 pages.

Office Action for related U.S. Appl. No. 13/483,144 dated Dec. 13, 2012, 9 pages.

Notice of Allowance dated May 22, 2013 for related U.S. Appl. No. 13/483,144, 9 pages.

Office Action dated Aug. 14, 2013 in related U.S. Appl. No. 13/483,137, 12 pages.

Final Office Action dated Dec. 30, 2013 in related U.S. Appl. No. 13/483,137, 20 pages.

Office Action dated Apr. 9, 2014 in related U.S. Appl. No. 13/483,137, 23 pages.

\* cited by examiner

APPARATUS AND METHOD FOR TRANSPORTATION AND UPSELLING OF PRODUCT

FIELD OF THE INVENTION

The invention generally relates to a system and method of using product profiling for the efficient transportation and upselling of product and, more particularly, to a system and method of using product profiling to maximize transportation capacity while meeting other business objectives, e.g., profitability.

BACKGROUND OF THE INVENTION

It is industry practice for domestic and international shipping and freight (transportation) companies to utilize methods for maximizing the amount of product (load) that can be loaded into a transportation vehicle such as, for example, a truck, an airplane, a train, a shipping container or other means of transportation. This allows the transportation companies to maximize profits by ensuring that the maximum amount of product is placed in the truck, airplane, train, etc. for transportation from one location to another location.

To maximize the load that can be transported, transportation companies use complex algorithms such as, for example, cubing algorithms, to ensure that all available space in the vehicle is used to its maximum capacity. In its simplest form, cubing is the act of placing smaller cubes (e.g., packages) into a large cube (e.g., a container for transport) in order to best fit all the cubes into the larger cube. Since packages can vary in size, a number of algorithms are known to be employed to create a best fit within the transportation space (larger cube), all of which are limited to the volume, dimensions and weight of the packages. Presently, cubing operations do not taken into account, nor are they concerned with the actual product and associated costs of manufacturing, sales data, etc. of the product or other business considerations, since such information is directly related to maximizing the transportation load in the vehicle.

Since most cubing applications center around the transportation industry, the amount of product to be transported is a function of the limitations of capacity of the transportation vehicle such as, for example, a truck. Thus, the cubing algorithms take into account the volume and dimensions of the packages, in addition to the mass of the packages. For example, cubing algorithms take into account the weight to volume ratio of the freight. This allows for the calculation to take into account the absolute capacity of the vehicle which is used to transport the product.

Accordingly, there exists a need in the art to overcome the deficiencies and limitations described hereinabove.

SUMMARY OF THE INVENTION

In a first aspect of the invention a method comprises defining product profiles and retrieving product information associated with the product profiles. The method further includes performing cubing operations for products associated with the retrieved product information.

In another aspect of the invention, a method comprises retrieving rules for defining the products and providing a summary of the products which match the rules. The method further includes correcting a proportionality of the products and performing cubing operations for the products based on the calculated correct proportionality.

In yet another aspect of the invention, a method comprises performing a past time period shipment inventory and retrieving information for products associated with the past time period shipment inventory. A determination is made as to whether the retrieved information for products, are products that are still in existence. The products associated with the retrieved information are cubed for future shipment, when the products were not previously subject to cubing operations.

In a further aspect of the invention, a method for deploying an application using product profiling to maximize load capacity of a vehicle includes providing a computer infrastructure being operable to retrieve product profiles, retrieve product information associated with the product profiles, and perform cubing operations for products associated with the product information.

In another aspect of the invention, a system comprising at least one of a hardware and software component for maximizing load capacity of a vehicle using product profiling is provided. The at least one hardware and software component is configured to retrieve product profiles, retrieve product information associated with the product profiles, and perform cubing operations for products associated with the product information.

In a further aspect of the invention, a computer program product comprises a computer usable medium having readable program code embodied in the medium. The computer program product includes at least one component to provide the method steps of the invention. At least one component can also provide the functionality of the system of the invention.

DETAILED DESCRIPTION OF EMBODIMENTS OF THE INVENTION

The invention generally relates to a system and method of using product profiling to maximize load capacity of a vehicle and, more particularly, to a system and method using product profiling to maximize load capacity of a vehicle while meeting other business objectives, e.g., maximizing profitability. In an embodiment of the invention, the method and system is configured to leverage cubing methods while using product profiles such as, for example, seasonal product adjustments, customer profiling, historical profiles of product inventories, vehicle loads, profitability of products, ordering profiles, etc. The invention may be implemented for business objectives such as, for example, maximizing product profitability, decreasing product inventory, increasing or decreasing product manufacturing, etc. The invention is equally applicable to direct transporting of the product by the manufacturer, or through a third party distributor, or the aggregation of shipments by traditional carriers.

By implementing the system and method of the invention, it is possible to maximize product profitability while increasing transportation loads, decreasing inventory and/or "moving" product which creates the highest profitability returns. The invention is configured to be applicable in current web based transactions or other real time transactions, using cubing methods in combination with the product profiling.

Figure 1:
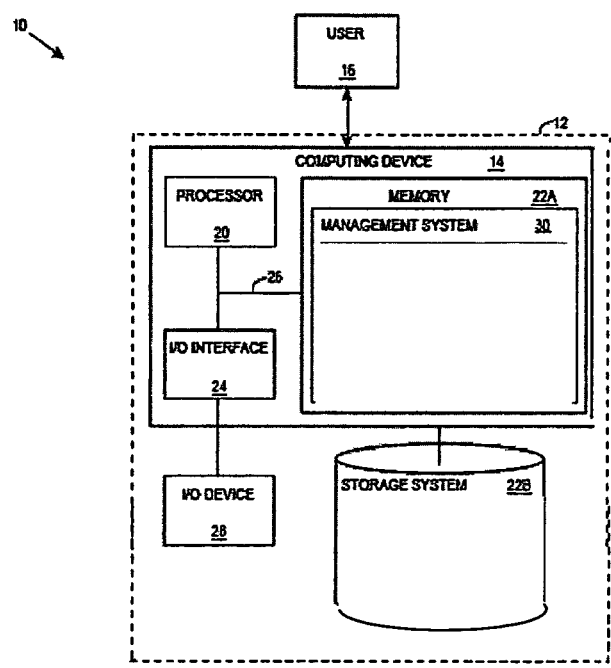
FIG. 1 shows an illustrative environment for implementing the steps in accordance with the invention.

FIG. 1 shows an illustrative environment 10 for managing the processes in accordance with the invention. To this extent, the processes described herein can be implemented over any distributed network or stand-alone server, for example. The environment 10 of FIG. 1 includes a computer infrastructure 12 that can perform the processes described herein. In particular, the computer infrastructure 12 includes a computing device 14 that comprises a management system 30, which makes computing device 14 operable to, for example, use product profiling with cubing operations in accordance with the invention, e.g., processes described herein. The computing device 14 includes a processor 20, a memory 22A, an input/output (I/O) interface 24, and a bus 26. Further, the computing device 14 is in communication with an external I/O device/resource 28 and a storage system 22B.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the process(es) described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols. As discussed herein, the management system 30 enables the computer infrastructure 12 to, for example, use product profiling with cubing operations.

In embodiments, the invention provides a business method that performs the process steps of the invention on a subscription, advertising, and/or fee basis. That is, a service provider, such as a Solution Integrator, could offer to perform the processes described herein. In this case, the service provider can create, maintain, deploy and support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Figure 2A:
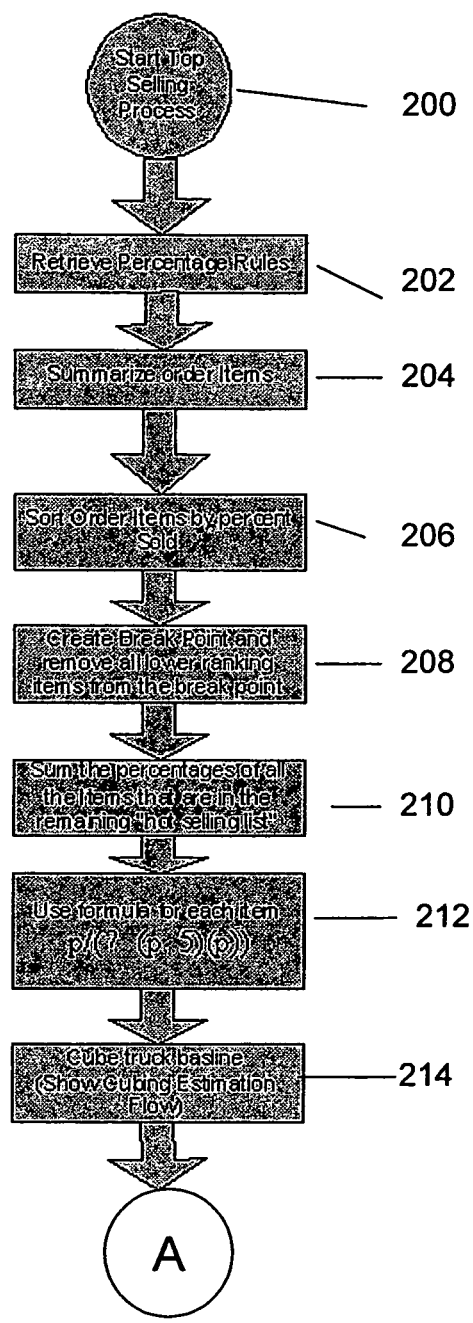
FIGS. 2a and 2b depict a flow chart of steps for implementing aspects of the invention.
Figure 2B:
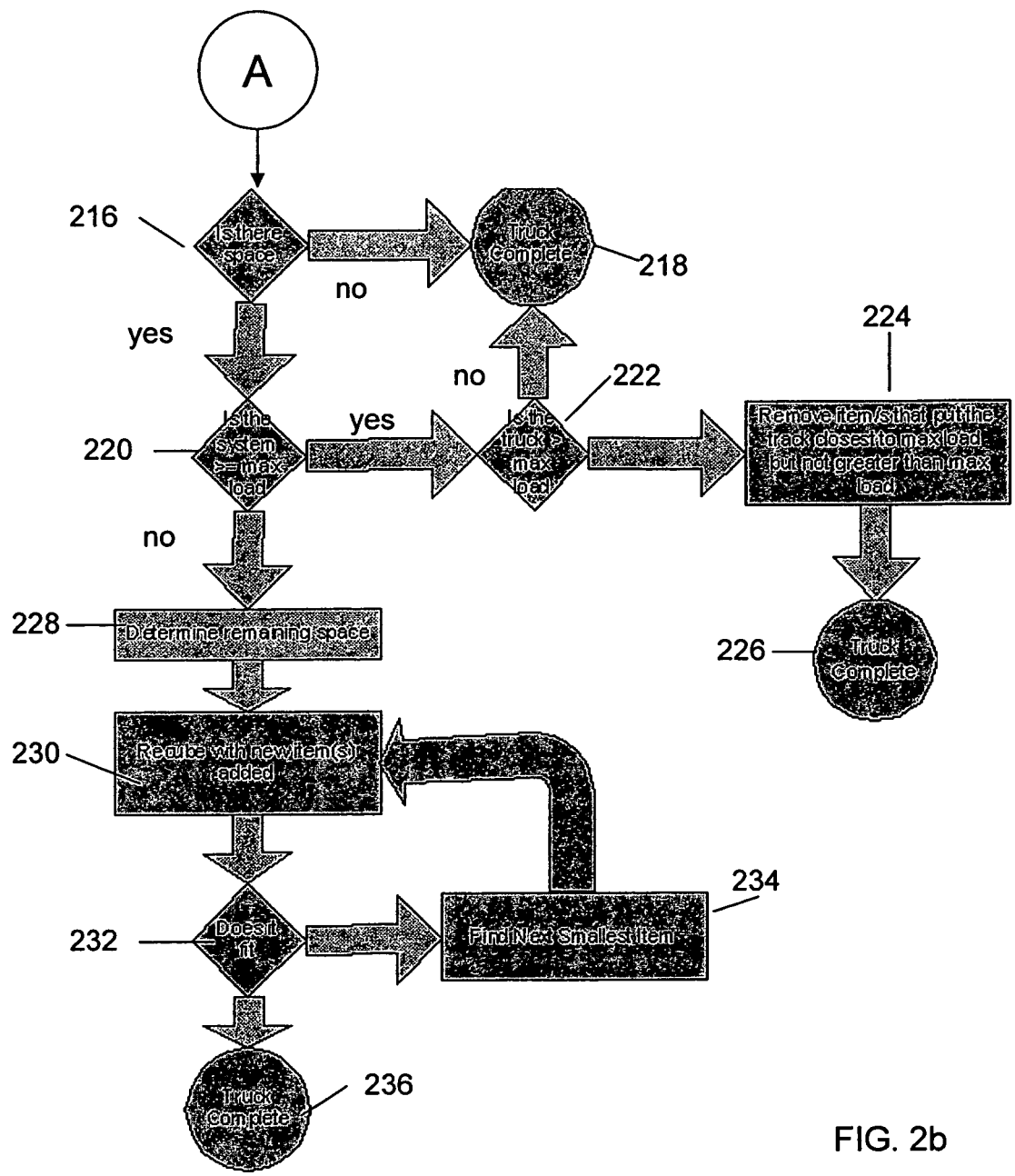

FIGS. 2a and 2b show a flow diagram implementing steps of the invention which may be implemented in the environment of FIG. 1. FIGS. 2a and 2b (and FIG. 3) may equally represent a high-level block diagram of the invention. The steps of FIGS. 2a and 2b are directed to a vehicle configuration for top selling product (items). In the flow of FIGS. 2a and 2b, the processes determine the top selling product, based on various criteria, e.g., product profiles, which will then be subject to cubing methodologies to ensure that the vehicle is filled to its capacity. In this manner, the invention is configured to most efficiently utilize the available space in a vehicle with particular product.

The steps of FIGS. 2a and 2b (and FIG. 3) may be implemented and executed from either a server, in a client server relationship, or they may run on a user workstation with operative information conveyed to the user workstation to automatically resolve calendar events. Additionally, the invention can take the form of an entirely hardware embodiment, an entirely software embodiment or an embodiment containing both hardware and software elements.

In an embodiment, the steps of FIGS. 2a and 2b (and FIG. 3) may be implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1, as should be understood and capable of implementation by those of skill in the art. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Referring back to FIGS. 2a and 2b, at step 200, the process locates top selling products. Top selling products may be defined as, for example, most profitable products, best selling products, etc. At step 202, the process retrieves rules which will be applied in subsequent steps. The rules may be machine generated or provided by the user. The rules may be, for example, a descriptor used for finding certain product. For example, the rules may be the five top selling products sold over the previous 12 months or the product that has remained in inventory for the longest time over the past 12 months, or other scenarios as determined by the user's needs and requirements. Thus, the rules may be any rule which is applicable for a given situation for later product retrieval. The results may be provided on a percentage or other statistical basis. The information associated with the rules may be gathered from historical product information stored, for example, in a database.

At step 204, a summary is provided of the products (also known as items) which match the rules (product profile). This summary information may be retrieved from a database or calculated and stored in volatile memory. The summary may include information about the products, including the amount of such product in inventory, the length of time the products were in inventory, or other statistical information maintained in the database. In one embodiment, the information is presented in a percentage format, as discussed in greater detail below.

At step 206, the products are sorted by one or combination of various methodologies. For example, the products may be sorted in ascending order or other ranking, depending on the specific user request. By way of illustrative example, the product may be sorted by proportional volume to other product. Illustratively, product "X" may be ranked higher than product "Y" if product "X" is 75% of the volume of the load and product "Y" is 15% of the volume of the load. An example can easily be implemented for weight, number of product, etc.

At optional step 208, a break point is created by the processes of the invention. The break point can be machine generated or input manually by a user. The break point will ensure that the load capacity of the vehicle is most efficiently used by eliminating product(s), for example, that do not fall within a certain percentage sales category. For example, the system and method of the invention may require any product which accounts for less than a certain percentage of sales, e.g., 3% or less, to be excluded from the shipment, even though the product met the rules set forth in step 202. This, in one implementation, will eliminate a skewed proportion of product from being loaded into a vehicle. By way of illustration, any product that is lower than 3% (or other predetermined amount) of sales will not be loaded into the vehicle thus allowing more product that accounts for a higher percentage of sales, e.g., 25% of sales, to be loaded into the vehicle.

Another example may be based on the percentage of profitability of product. For example, the break point may designate that any product which has a profitability of less than 3% (or other predetermined amount) be excluded from the shipment. In this way, more product with a higher profitability can be loaded into the vehicle for shipment. This, by virtue of including more product with higher profitability, will maximize the profitability of the shipment.

At step 210, the sum of all the percentages of all of the retrieved product is calculated. The sum of all percentages of the product can be calculated by the following equation:

$$P_1 + P_2 + P_3 + P_4 \ldots = \text{sum of all product.}$$

It is noted that the sum of all product may also be represented numerically as:

$$\sum_{n>0}^{X \geq top} P(x)$$

where,
n=the position in the array (in the example above the array includes $P_1$-$P_5$);
n>0; and
x is greater than or equal to top, defined as the highest position in the array.

At step 212, the process determines the correct proportionality of the selected product as if the vehicle was filled to capacity (e.g., 100%). In one example, the following equation may be used to correct the proportionality of the selected product:

$$P(n) \Bigg/ \left( \sum_{n>0}^{X \geq top} P(x) \right)$$

where,
P=product;
n=the position in the array (in the example above the array includes $P_1$-$P_5$);
n>0; and
x is greater than or equal to top, defined as the highest position in the array.

At step 214, a cubing method is performed using the product obtained in the previous steps. By way of example, at step 216, a determination is made as to whether there is additional space in the vehicle. If not, then the process ends at step 218. If there is additional space, at step 220, a determination is made as to whether the weight limit is equal to or exceeds the maximum allowable weight for the vehicle. If the weight limit is equal to or exceeds the maximum allowable weight, at step 222, a determination is made as to whether the weight limit has been exceeded. It should be understood that steps 220 and 222 can be combined into a single step. If the weight limit has not been exceeded, then the process ends at step 218. If the weight limit has been exceeded, at step 224, product is removed until the weight limit is not exceeded. At step 226, the process ends.

In one embodiment, if the weight limit has been exceeded certain product is removed in an attempt to be as close as possible to the maximum allowable weight of the vehicle. In one embodiment, the product is removed based on its ranking. For example, the product with the least profitability would be removed prior to a product with a greater profitability. Also, other removal schemes are contemplated by the invention such as, for example, removing product that has the least sales potential or profitability relative to its size and aggregate.

If the maximum allowable weight has not been reached, at step 228, the process will determine the remaining available space in the vehicle. At step 230, product will be added to the vehicle based on the results of the cubing operation. At step 232, a determination will be made to determine if the product fits in the vehicle, and if not, the process proceeds to step 234. At step 234, the process finds the next smallest product and then returns to step 230 for further cubing operations. If the product does fit, at step 236, the process ends.

In an embodiment, weight cubing estimation and/or volume cubing estimation may be implemented with the invention. Accordingly, the user may select the weight cubing estimation and/or volume cubing estimation, both of which provide an estimation point for the beginning of cubing operations. The weight cubing estimation workflow may be calculated as follows:

(Total weight capacity of vehicle)(% of vehicle to fill)
=total weight to fill for product.

The total weight to fill for product/weight of product=number of product to fill.

The volume cubing estimation workflow may be calculate as follows:

(Total volume capacity of vehicle)(% of vehicle to fill)=total volume to fill for product.

The total volume to fill for product/volume of product=number of product to fill.

Figure 3:
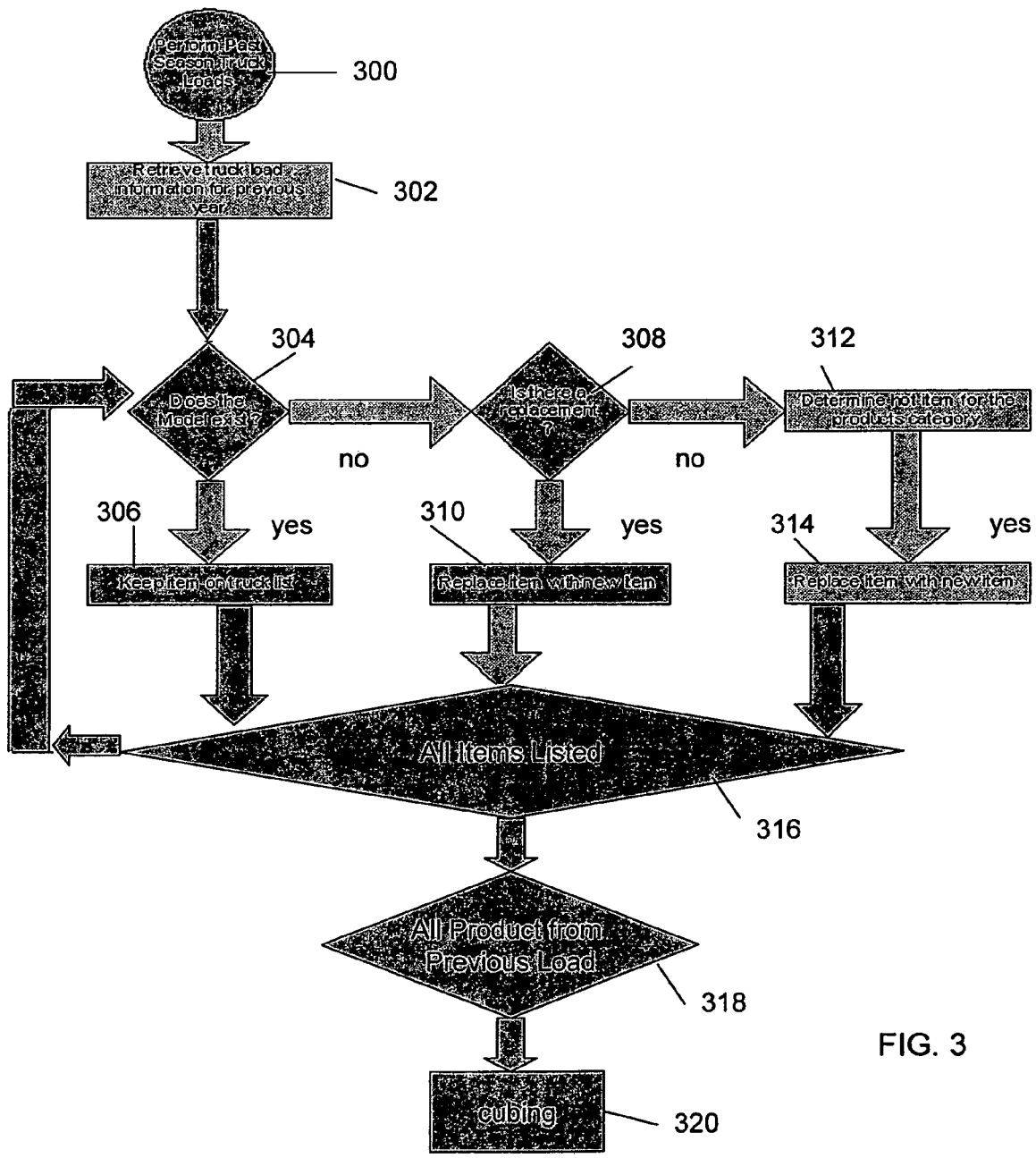
FIG. 3 depicts a flow chart of steps for implementing an alternative aspect of the invention.

FIG. 3 shows another flow of steps in accordance with another embodiment of the invention. The flow of FIG. 3 illustrates one example of using past seasonal data (or data from other time periods) for preparing a list of products to be loaded into a vehicle such as, for example, a truck, shipping container, etc. In this implementation, as a vehicle with products is purchased, a list of the products to be loaded on the vehicle is stored in a profiling system with a vehicle type ID identifying the vehicle, the date the products (e.g., also referred to as a vehicle) was ordered, each product in the vehicle, the maximum volume and weight for the vehicle, a number of times the vehicle type has been purchased, and/or the customer that purchased the vehicle (product in the vehicle).

By way of discussion, at step 300, the process performs a past season (or data from other time periods) shipment inventory. The past season shipment inventory may be considered a rule (or product profile). The past season shipment inventory may include, for example, determining which shipment (e.g., truckload, container) included product that was most profitable. At step 302, the process retrieves the information associated with the previous season or other time periods. This information may be retrieved from a database which stores such information or calculated from a population of historic shipments.

At step 304, a determination is made as to whether the retrieved product still exists (e.g., is in inventory or manufactured). If the product still exists, the product will remain on the list for future shipping, at step 306. At step 308, if the product does not exist, a determination is made as to whether there is a replacement product. If there is a replacement product, then the replacement product is placed on the list at step 310.

If there is no replacement product, then the process continues to step 312. At step 312, if there is no replacement product, then a determination is made as to whether there is another product that is a "hot" product. A "hot" product may be a product with a profitability above a certain threshold, a product that has sales above a certain threshold, etc. If there is a "hot" product, then the "hot" product will be placed on the list at step 314.

Stemming from steps 306, 310 and 314, a determination is made as to whether all of the products are on the list (step 316). If all of the products are not on the list, then the process returns to step 304. If all of the products are on the list, a determination is made as to whether all of the products on the list were loaded onto a vehicle (single vehicle) in the past (step 318). If all of the products are existing product and were previously loaded into a vehicle, then the process ends at step 320. At step 320, the list is stored in a database, flat file, etc. for future retrieval or stored in volatile memory for further processing. In this scenario, cubing of the existing products is not necessary since such cubing operations were previously performed for the past vehicle load.

If all of the products are not from a past vehicle load, the process continues to step 322, where cubing operations are performed. The cubing operations may include, for example, those previously described with reference to FIGS. 2a and 2b, including, for example, step 214, etc. Once cubing operations are complete, the process ends at step 320, where the list is stored for future retrieval.

It should be understood that other steps of FIG. 3 may be intermingled with the processes of FIGS. 2a and 2b. By way of example, the retrieval of the product information from a previous time period (step 302) may be for the top selling product (step 200) or may be obtained from rules retrieved at step 202. Additionally, the products sold in previous time periods may be sorted (step 208), or a break point may be applied to these products, as well (step 208). In the case that the products are replacement products or other "hot" products, the invention contemplates that steps 210 and 212 may be utilized in order to correct the proportionality of the shipment.

EXAMPLE OF USE

As an illustrative example, using the flow of FIGS. 2a and 2b, a user requests the five top selling product (step 202). Using this example, the process retrieves $P_1, P_2, P_3, P_4$ and $P_5$ (step 204) and summarizes and sorts the products based on a ranking, e.g., highest percentage (step 206, step 208). More specifically, as an example, $P_1$ is 30%, $P_2$ is 10%, $P_3$ is 7%, $P_4$ is 5% and $P_5$ is 4%. The process sums the product to obtain 56% (step 210). In this example, there is no break point.

To correct the proportionality of the product to fill the vehicle to 100%, the process applies the following equation:

$$P(n) \Big/ \left( \sum_{n>0}^{X \geq top} P(x) \right)$$

Using the above equation, the correct proportionality of the product, $P_1$ would be approximately 54%, $P_2$ would be approximately 18%, $P_3$ would be approximately 13%, $P_2$ would be approximately 9%, $P_5$ would be approximately 6%. The system and method can then perform cubing operations, allocating the volume of the vehicle in accordance with the above percentages.

While the invention has been described in terms of embodiments, those skilled in the art will recognize that the invention can be practiced with modifications and in the spirit and scope of the appended claims.

What is claimed is:

1. A method comprising:
defining product profiles;
retrieving product information associated with the product profiles, wherein the product information is retrieved as percentages or other statistical information;
summing the percentages of the products,
wherein the summing is calculated by:

$$\sum_{n>0}^{X \geq top} P(x)$$

where,
n=the position in the array;
n>0; and
x is greater than or equal to top, defined as the highest position in the array; and
performing cubing operations, by a computer device, for products associated with the product information.

2. The method of claim 1, further comprising correcting a proportionality of the products.

3. The method of claim 2, wherein the correcting of the proportionality of the products is calculated by:

$$P(n) \Big/ \left( \sum_{n>0}^{X \geq top} P(x) \right)$$

where,
P=product;
n=the position in the array;
n>0; and x is greater than or equal to top, defined as the highest position in the array.

4. The method of claim 3, wherein the cubing method is performed after the correcting of the proportionality of the products.

5. The method of claim 1, wherein the cubing operations include a determination as to whether at least one of a weight limit and volume limit has been exceeded.

6. The method of claim 5, wherein when the weight limit is exceed certain product is removed until the weight limit is not exceeded.

7. The method of claim 6, wherein the certain product is removed based on its ranking.

8. The method of claim 1, further comprising retrieving product information from past shipments.

9. The method of claim 8, further comprising determination of whether retrieved products are in inventory or currently being manufactured, wherein when the products are in inventory or currently being manufactured, the product remains on the list for future shipment.

10. The method of claim 9, wherein:
when the product is not in inventory or currently being manufactured, a determination is made as to whether there is a replacement product or another product,
when there is a replacement product, the replacement product is placed on the list;
when there is no replacement product, the another product is placed on the list.

11. The method of claim 1, wherein the defining product profiles are based on rules.

12. The method of claim 11, wherein the rules are descriptors or criteria used for the retrieval of the product information.

13. The method of claim 1, further comprising, as products are purchased, storing a list of the products to be shipped in a profiling system with the other statistical information.

14. The method of claim 13, wherein the other statistical information includes at least one of a vehicle type ID identifying the vehicle in which the products are to be shipped, a date the products were ordered, the products in the vehicle, a maximum volume and weight for the vehicle, a number of times the vehicle with the products has been purchased, and a customer that purchased the products to be shipped in the vehicle.

15. The method of claim 1, wherein the product profiles include at least one of seasonal product adjustments, customer profiling, historical profiles of product inventories, profitability of products, top selling products and ordering profiles.

16. The method of claim 1, further comprising providing a summary of the products which match the product profiles, the summary includes the other statistical information.

17. The method of claim 1, wherein the steps of claim 1 are implemented in web based transactions or other real time transactions.

18. The method of claim 1, wherein the retrieving product information includes sorting the product information by a ranking.

19. The method of claim 1, further comprising providing a break point to eliminate a skewed proportion of the products.

20. The method of claim 1, wherein the steps of claim 1 are provided by a service provider under a subscription and/or fee agreement and/or based on advertising content to one or more third parties.

21. The method of claim 1, wherein a service provider at least one of creates, maintains and supports a computer infrastructure that performs the steps of claim 1.

22. The method of claim 1, wherein the cubing operations create a best fit of the products in a vehicle.

23. The method of claim 1, wherein the cubing operations maximize a load capacity of a vehicle and further comprise determining a remaining available space in the vehicle, and wherein the method further comprises:
adding one of the products to the vehicle based on the cubing operations;
determining if the one of the products fits in the vehicle; and
if the one of the products does not fit in the vehicle, finding a next smallest product of the products to add to the vehicle.

24. The method of claim 1, wherein the cubing operations take into account:
volume of the products;
dimensions of the products;
mass of the products; and
weight to volume ratio of the products.

25. The method of claim 1, wherein the cubing operations include a weight cubing estimation and a volume cubing estimation.

26. The method of claim 1, further comprising providing a break point that designates that any product having a profitability of less than a predefined limit is excluded from shipment.

27. The method of claim 1, further comprising storing a list of the products to be shipped in a profiling system with the other statistical information, wherein the other statistical information comprises:
a vehicle type ID identifying a vehicle in which the products are to be shipped;
the products in the vehicle; and
a maximum volume and weight for the vehicle.

28. The method of claim 1, further comprising:
providing a break point that designates that any product having a profitability of less than a predefined limit is excluded from shipment;
storing a list of the products to be shipped in a profiling system with the other statistical information, wherein the other statistical information comprises: a vehicle type ID identifying a vehicle in which the products are to be shipped; the products in the vehicle; and a maximum volume and weight for the vehicle, wherein:
the cubing operations do one of: create a best fit of the products in the vehicle, and maximize a load capacity of the vehicle;
the cubing operations take into account: volume of the products; dimensions of the products; mass of the products; and weight to volume ratio of the products;
the cubing operations include a weight cubing estimation and a volume cubing estimation; and
the cubing operations comprise determining a remaining available space in the vehicle;
adding one of the products to the vehicle based on the cubing operations;
determining if the one of the products fits in the vehicle; and
if the one of the products does not fit in the vehicle, finding a next smallest product of the products to add to the vehicle.

29. The method of claim 1, further comprising:
locating top selling products; and
retrieving the product information based on the top selling products and the product profiles.

30. The method of claim 1, further comprising sorting the products associated with the product information by at least one of a proportional volume, a proportional weight, and a proportional number of a product, to other products.

31. The method of claim 1, wherein the cubing operations comprise a weight cubing estimation calculated by:
   determining a total weight to fill for the products based on a total weight capacity of a vehicle and a percentage of the vehicle to fill; and
   determining a number of the products to fill based on the total weight to fill for the products and a weight of the products.

32. The method of claim 1, wherein the cubing operations comprise a volume cubing estimation calculated by:
   determining a total volume to fill for the products based on a total volume capacity of a vehicle and a percentage of the vehicle to fill; and
   determining a number of the products to fill based on the total volume to fill for the products and a volume of the products.

* * * * *